H. A. MASON.
FEEDING DEVICE FOR HAY BALING PRESSES.
APPLICATION FILED NOV. 25, 1916.

1,257,510.

Patented Feb. 26, 1918.

Witnesses

Inventor
Henry A. Mason.
By John D Thomas & Co.
Attorneys.

UNITED STATES PATENT OFFICE.

HENRY A. MASON, OF LAWNDALE, ILLINOIS.

FEEDING DEVICE FOR HAY-BALING PRESSES.

1,257,510.      Specification of Letters Patent.   Patented Feb. 26, 1918.

Application filed November 25, 1916. Serial No. 133,266.

*To all whom it may concern:*

Be it known that I, HENRY A. MASON, a citizen of the United States, and a resident of Lawndale, in the county of Logan and State of Illinois, have invented Feeding Devices for Hay-Baling Presses, of which the following is a full and complete specification.

My invention is an improvement in hay baling presses of that particular character which are adapted to be drawn over the field so that the hay which has been previously gathered or raked in a windrow may be fed directly to the machine and thereby more economically baled for storage or shipment.

In the operation of portable baling presses of this general type the hay is fed by an operator into the baling-chamber of the press from a receiving or feeding table, and in order to elevate the hay from the windrow and deliver it on to this feeding table two men are usually required, who walk alongside the machine and toss the hay onto the table by the aid of pitch-forks.

The primary object of my invention is to gather the hay from the windrow, elevate and deliver it onto the receiving or feeding table by mechanical means, thereby dispensing with the services of the two pitchers or hay-tossers and consequently reducing the cost of baling the hay; the means employed in the present instance also serving to deliver the hay onto the feeding table in better shape and more regularly or in uniform quantities, making it possible to materially increase the output of the machine.

To accomplish the gathering and delivering of the hay to the baling machine by mechanical means I employ an endless conveyer which is firmly secured to the machine to travel over the field therewith at one side thereof, said conveyer being disposed in the line of travel so that it may operate on the row of hay, or windrow, and is provided with teeth which pick up the hay and elevate it to the proper height for delivery on to the feeding table; the construction of the conveyer being such in the present instance as to insure the hay being picked up clean from the ground, carried to the proper height and freed from the teeth when it arrives at the upper end of the conveyer.

The particular construction of the device or attachment and manner of operation is fully described in the following specifications, and shown in the accompanying drawings, and what I particularly claim as new, and desire to protect by Letters-Patent is more specifically set forth in the appended claims.

Figure 1:
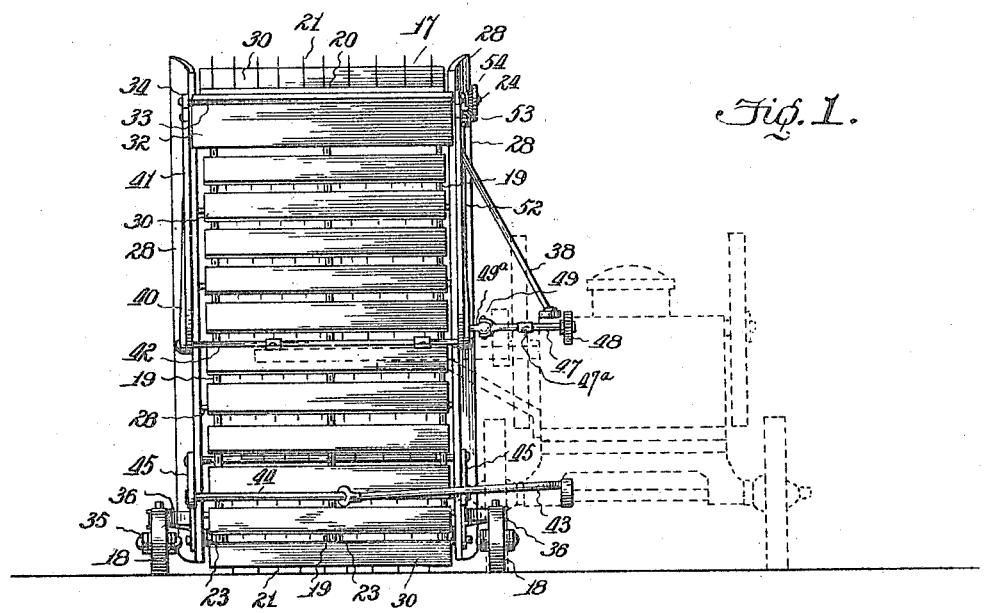
Figure 2:
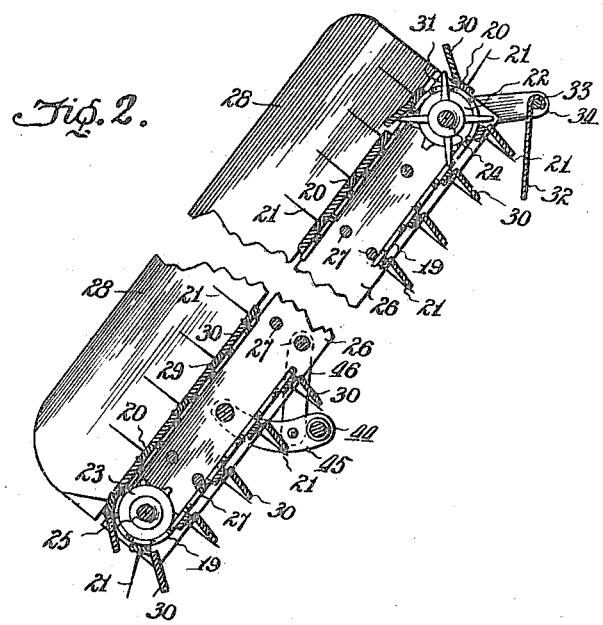

In the drawings: Figure 1 is a rear view illustrating the application of my improved device or conveyer in connection with a conventional type of portable baling press. Fig. 2 is a longitudinal sectional view, enlarged, through the conveyer or feeding device.

My improved feeding device may be applied to any ordinary type of portable baling press which is adapted to be drawn over the ground for baling the hay in the field, and therefore in the drawings I have shown in dotted lines only so much of the baling machine as is necessary to illustrate the application of the conveyer thereto. In the general type of baling machine to which my invention is applicable there is usually a long body supported on ground wheels for convenience in drawing the machine over the field; the baling-box being located at the rear end of the body as usual and the engine or motor at the forward end thereof. Baling machines of this type are usually provided with a feeding table, extending beyond one side of the body at the forward end of the baling-chamber and supported in some convenient manner.

In carrying out my invention I provide for mechanically elevating and depositing the hay from the windrow on to the feeding table and accomplish this by means of an endless conveyer, 17, disposed in front of the table alongside of the baling machine and rigidly secured thereto so as to travel therewith, the conveyer being supported at its lower end a suitable distance above the ground by wheels 18, and inclined at a proper angle with the upper end thereof positioned above the aforesaid feeding-table for depositing the hay directly thereon and in condition to be fed by the operator into the baling-chamber.

The conveyer-belt in the present instance is made up of three similar sprocket-chains 19, across which are attached narrow strips 20 spaced a short distance apart and having teeth 21 projecting outwardly therefrom to gather the hay from the windrow and carry it to the upper end of the conveyer, the chains passing over sprocket-wheels 22 and 23 at the upper and lower ends of the conveyer, respectively, and keyed to shafts 24 and 25 mounted between the side pieces 26, 26 of the frame of the conveyer. The frame which supports the conveyer-belt is made up of said side pieces 26, 26, and connecting crossbars 27, with flaring side boards 28 at each side of the belt above the side pieces 26. To increase the effectiveness of the conveyer-belt each tooth-carrying strip 20 has hinged to one edge thereof, by hinges 29, a filling-board or paddle 30 of a width corresponding to the space between said strip and the next adjoining strip, said boards or paddles being hinged to that edge of the strips which is lowermost when said strips are uppermost of the belt, so as to close the aforesaid spaces on the upward travel of the belt, as clearly shown in Fig. 2, thereby holding the hay in its travel up with the conveyer-belt and preventing wind from blowing it off the teeth. As these boards or paddles turn at the upper end of the conveyer they also act to free the hay from the teeth so that it will fall on to the feeding-table of the baling machine, this operation being effected at the proper time by means of reels or tappet-arms 31 secured on the shaft 24 to strike against the underside of the paddles and lift them, said arms working in between the tooth-carrying strips 20. The filling boards or paddles are preferably made of thin material or thin boards and operate by gravity to close the spaces between the tooth-carrying strips, and as they make the turn at the lower end of the conveyer they will assist the teeth in gathering the hay and starting it up the conveyer. As the hay leaves the conveyer-belt it is guided toward the feeding-table by an apron-board 32 suspended from a rod 33 supported at its ends in arms 34 secured to and projecting from the upper ends of the side pieces 26 of the conveyer-frame.

The supporting-wheels 18 of the conveyer are each journaled in a horizontal forked frame 35 swiveled in a bracket 36 bolted to and projecting from the conveyer-frame, so that said wheels may freely shift laterally when the baling machine is turned and permit the conveyer to turn with the machine without straining the connections.

The feeding device or conveyer may be attached to the baling machine in any suitable manner, it being necessary of course that the connections are such as to maintain said conveyer parallel to the machine and at the proper inclination. In the present instance I have shown an arrangement of braces or connections which answer the purpose, consisting of rods 38 diverging from the upper end of the conveyer-frame to the upper part of the body of the baling-machine; two pairs of brace-bars 40, 41, converging from each side of the upper end of the conveyer-frame and connected at their lower ends to a transverse rod 42 secured on top of the feeding-table 15; and a heavy shaft-bar 43 extending from the rear axle 14 and attached to a bar 44 extending across the underside of the lower end of the conveyer, the last mentioned connecting-bar, 43, serving to push the conveyer into the hay row as well as hold the lower portion thereof in proper alinement with relation to the baling machine and windrow. The transverse attaching-bar 44 is secured to the side pieces of the conveyer-frame by bracket-arms 45, suitably braced by metal-straps 46, whereby said attaching-bar is located beyond the path of the teeth 21 and filling boards or paddles 30 which trail along in the rear of said teeth.

The conveyer-belt may be driven from any convenient or suitable source of power, either by the traction of the baling-machine as it is drawn over the field or by the engine or motor which operates the baling mechanism. In the drawings I have shown the conveyer-belt as driven from the engine of the baling-machine. In this instance I employ a short shaft 47 having a spurwheel 48 adapted to mesh with a driven part of the motor and connected by universal-joint 49 to a short shaft 49$^a$ suitably geared to a driving-shaft 52 extending to the upper end of the conveyer and geared directly to the upper belt shaft 24 by bevel gearwheels 53 and 54. By providing a jointed shaft as a gear connection between the baling machine and conveyer it permits of the required play necessary to compensate for any slight independent movement of the conveyer in traveling over uneven or hilly ground.

The wheels 18 support the lower end of the conveyer at a proper distance above the ground so that the teeth will act to pick up the hay clean.

The operation of the device for feeding or delivering the hay from the windrow to the feeding table of the baling machine will be readily understood from the foregoing description in connection with the accompanying drawings, for the conveyer being attached to the machine at one side thereof and in front of the feeding-table, and the complete apparatus drawn over the field so that the conveyer will pass in the line of the windrow or row of hay, the conveyer-belt will be driven by the engine operating the baling mechanism and the teeth of said conveyer-belt will pick up the hay and carry it up over the feeding-table to deposit it thereon for the operator to feed to the baling-chamber. As the hay passes up the conveyer it is prevented from being blown off the teeth by the hinged boards 30 filling the spaces between the tooth-carrying strips thus forming a closed belt. In this manner the hay is mechanically picked up and delivered on to the feeding table without requiring it to be handled manually, and it will be understood that the rapidity of delivering the hay is governed by the rate of movement of the machine or apparatus over the field and speed of the engine, which of course may be regulated to correspond with the working capacity of the operator feeding the baling-chamber.

I have found by actual practice of the invention that the feeding or hay delivering device will operate better in such instances where the hay has been gathered in a windrow by the use of a side delivery hay-rake, but it also operates successfully when the hay has been gathered in a row by a dump-rake, in each instance the teeth on the conveyer-belt acting to pick up the hay from the ground after the manner of an ordinary hay-fork, and very clean.

The conveyer requires no attention after it has been properly attached to the baling-press and adjusted with respect thereto, and therefore the service of operators to pitch the hay onto the feeding table or take care of this part of the operation of baling is dispensed with resulting in a saving of labor.

In transporting the machine or apparatus from place to place, or to and from the field, the conveyer is first detached from the baling-press by disconnecting the power transmitting shaft and releasing the brace-rods when the conveyer may be lifted onto the feeding-table of the baling-press and in this manner conveniently carried by the baling-press as it is drawn over the ground.

Having described my invention, I claim:

1. A conveyer-belt for baling machines, comprising endless chains passing over sprocket-wheels, strips attached to the chains transversely of the belt and spaced apart, teeth projecting outwardly from the strips, and boards operating to close the spaces between the strips on the upward movement of the belt and swing outward as the belt turns at its upper end.

2. A conveyer-belt for baling machines, comprising endless chains passing over sprocket-wheels, narrow strips attached to the chains transversely of the belt and spaced apart, teeth projecting outwardly from the strips, boards hinged to close the spaces between the strips on the upward movement of the belt, and tappet-arms at the upper end of the conveyer for raising the boards, substantially as shown and described.

HENRY A. MASON.

Witnesses:
J. J. WILMERT,
T. P. LONGAN.

Copies of this patent may be obtained for five cents each, by addressing the "Commissioner of Patents, Washington, D. C."